US008125669B2

(12) United States Patent
Chen et al.

(10) Patent No.: US 8,125,669 B2
(45) Date of Patent: Feb. 28, 2012

(54) SYSTEMATIC APPROACH TO UNCOVER GUI LOGIC FLAWS

(75) Inventors: Shuo Chen, Kenmore, WA (US); Yi-Min Wang, Bellevue, WA (US); Jiahe Helen Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

(21) Appl. No.: 11/772,085

(22) Filed: Jun. 29, 2007

(65) Prior Publication Data
US 2008/0127341 A1 May 29, 2008

Related U.S. Application Data

(63) Continuation of application No. 11/565,426, filed on Nov. 30, 2006.

(51) Int. Cl.
G06F 15/00 (2006.01)
G06F 11/00 (2006.01)

(52) U.S. Cl. ......................... 358/1.15; 726/25
(58) Field of Classification Search ................. 358/1.15, 358/1.14, 1.13, 1.16, 1.18, 3.28, 1.2; 715/730, 715/760, 764, 751, 766, 784; 726/25, 22, 726/15, 23, 4; 717/100, 143, 170; 709/227, 709/200
See application file for complete search history.

(56) References Cited

U.S. PATENT DOCUMENTS

| | | | | |
|---|---|---|---|---|
| 5,892,903 | A * | 4/1999 | Klaus | 726/25 |
| 2003/0159063 | A1 | 8/2003 | Apfelbaum et al. | |
| 2004/0260940 | A1 | 12/2004 | Berg et al. | |
| 2005/0086161 | A1 | 4/2005 | Gallant | |
| 2005/0235044 | A1 | 10/2005 | Tazuma | |
| 2005/0235351 | A1 * | 10/2005 | Seltzer et al. | 726/14 |
| 2005/0273859 | A1 * | 12/2005 | Chess et al. | 726/25 |
| 2006/0041508 | A1 | 2/2006 | Pham et al. | |
| 2006/0041754 | A1 | 2/2006 | Hind et al. | |
| 2006/0070008 | A1 | 3/2006 | Sauve et al. | |
| 2006/0075028 | A1 | 4/2006 | Zager et al. | |
| 2006/0080735 | A1 | 4/2006 | Brinson et al. | |
| 2006/0123478 | A1 | 6/2006 | Rehfuss et al. | |
| 2006/0259973 | A1 | 11/2006 | Sima et al. | |
| 2007/0074188 | A1 | 3/2007 | Huang et al. | |
| 2008/0134338 | A1 * | 6/2008 | Chen et al. | 726/25 |

FOREIGN PATENT DOCUMENTS

WO WO0171554 A2 9/2001

(Continued)

OTHER PUBLICATIONS

Non-Final Office Action for U.S. Appl. No. 11/565,426, mailed on Jun. 23, 2011, Shou Chen, "A Systematic Approach To Uncover GUI Logic Flaws", 31 pages.

(Continued)

*Primary Examiner* — Saeid Ebrahimi Dehkordy
(74) *Attorney, Agent, or Firm* — Lee & Hayes, PLLC

(57) ABSTRACT

To achieve end-to-end security, traditional machine-to-machine security measures are insufficient if the integrity of the graphical user interface (GUI) is compromised. GUI logic flaws are a category of software vulnerabilities that result from logic flaws in GUI implementation. The invention described here is a technology for uncovering these flaws using a systematic reasoning approach. Major steps in the technology include: (1) mapping a visual invariant to a program invariant; (2) formally modeling the program logic, the user actions and the execution context, and systematically exploring the possibilities of violations of the program invariant; (3) finding real spoofing attacks based on the exploration.

16 Claims, 15 Drawing Sheets

FOREIGN PATENT DOCUMENTS

| | | |
|---|---|---|
| WO | WO2004099949 A1 | 11/2004 |
| WO | WO2006036170 A1 | 4/2006 |

OTHER PUBLICATIONS

Adelsbach, et al., "Visual Spoofing of SSL Protected Web Sites and Effective Countermeasures", retrieved at <<http://www/nds.rub.de/gajek/papers/adgasc2004ssl.pdf>>, Information Security Practice and Experience Conference, Singapore, Apr. 11-14, 2005, Springer-Verlag, Heidelberg, 2005, pp. 13.

Jia et al., "Rigorous and Automatic Testing of Web Applications", School of Computer Science, Telecommunication and Information Systems, DePaul University, Chicago, IL, 2002, pp. 1-7.

Levy, "Interface Illusions", retrieved at <<http://ieeexplore.ieee.org/iel5/8013/29915/01366123.pdf?isnumber=&arnumber=1366123>>, IEEE Computer Society, Nov.-Dec. 2004, pp. 66-69.

Li, et al., "Trust on Web Browser: Attack vs. Defense", retrieved at <<http://www.i2r.a-star.edu.sg/icsd/staff/tieyan/papers/trust-browser-final.pdf>>, Institute for Infocomm Research, Singapore, 2003, pp. 13.

Yuan, et al., "Web Spoofing 2001", retrieved at <<http:www.cs.dartmouth.edu/~pkilab/demos/spoofing/tr.pdf>>, Department of Computer Science/Institute for Security Technology Studies, Dartmouth College, Jul. 2001, pp. 1-16.

\* cited by examiner

| Number 1102 | Location 1104 | Condition 1106 |
|---|---|---|
| 1 | FireNavigationComplete | GetHTMLWinUrl() = NULL |
| 2 | FireNavigationComplete | GetPFD(bstrUrl)=NULL |
| 3 | FireNavigationComplete | ActivatedView = true |
| 4 | NavigationComplete | DontFireEvents = true |
| 5 | NavigationComplete | DocInPP = true |
| 6 | NavigationComplete | ViewWOC = true |
| 7 | NavigationComplete | ObjectTG = true |
| 8 | NavigationComplete | CreateDFU = true |
| 9 | SetAddressBar | CurrentUrl = NULL |
| 10 | SetClientSite | QIClassID()= OK |
| 11 | LoadHistory | HTMLDoc = NULL |
| 12 | CreateMarkup | NewMarkup = NULL |
| 13 | SetInteractive | pPWindowPrxy=NULL |
| 14 | SetInteractive | IsPassivating = true/IsPassivated |
| 15 | SetInteractive | HtmCtx() = NULL17 |
| 16 | SetInteractive | HtmCtx()->BindResult = OK |
| 17 | EnsureView | IsActive() = false |
| 18 | RenderView | RSFC = NULL |

Fig. 11

SYSTEMATIC APPROACH TO UNCOVER GUI LOGIC FLAWS

RELATED APPLICATIONS

This is a continuation of and claims priority to U.S. patent application Ser. No. 11/564,426 filed on Nov. 30, 2006 entitled "A Systematic Approach to Uncover GUI Logic Flaws" by first named inventor Shuo Chen.

BACKGROUND

Graphic interfaces, such as graphic interfaces of web browsers, typically have security vulnerabilities in the form of visual spoofing. Such vulnerabilities can lead to malicious exploitations such as address bar spoofing and status bar spoofing. Such spoofing can lure even experienced users to perform unintended actions that result in serious security consequences.

The computer-human interface or graphical user interface (GUI) plays an important role in systems security since a computer is simply a tool for people to perform real world activities, such as banking, trading, advertising and socializing. A user should be considered an "endpoint" of a communication channel between a server and client. Currently the trustworthiness of the "world wide web" is mainly to provide machine-to-machine trust over the Internet, so that the client (e.g., the browser computer) communicates to the intended server. Such a trust can be easily shattered by the last link between the client and its user (i.e., the "endpoint"), and thus the end-to-end security is compromised.

The exposure of the machine user weakness is not limited to non-technical social engineering attacks where naive users are fooled to click on an arbitrary hyperlink and download malicious executables without any security awareness. Even for a technology savvy and security conscious user, vulnerabilities exist, and spoofing can take place. For example, even if an experienced user examines a status bar of the email client before the user clicks on a hyperlink, the user may not be able to tell that the status bar is spoofed and is navigated to an unexpected website. Furthermore, even if a user checks correspondence between a displayed uniform resource locator (URL) in a browser address bar and top level web page content, the user may not realize that the address bar is spoofed and that the displayed page comes from a malicious web site. Indeed, the combination of the email status bar spoofing and the browser address bar spoofing can give a rather "authentic" browsing experience to a faked web page. Spoofing can lead to numerous malicious acts, such as identity theft (i.e., "phishing"), malware installation, and faked news or information.

A visual spoofing flaw is a generic term that refers to any flaw producing a misleading user interface or graphical user interface (GUI). Such flaws have been discovered in various commodity browsers (i.e., Internet browsers) including Internet Explorer (IE), Firefox, and Netscape Navigator. Visual spoofing flaws can be due to GUI logic flaws, where such flaws allow a malicious party to set "wrong" information in authentic security indicators, where authentic security indicators include email client status bars, the browser address bars and security warning dialog boxes.

SUMMARY

This summary is provided to introduce simplified concepts of uncovering logic flaws in graphical user interface, which is further described below in the Detailed Description. This summary is not intended to identify essential features of the claimed subject matter, nor is it intended for use in determining the scope of the claimed subject matter.

In an embodiment, the methodology maps a visual invariant to a well-defined program invariant, which is a Boolean condition about user state and software state. This mapping is done based on an in-depth understanding of the source code of the software. The methodology is then to discover all possible inputs to the software which can cause the visual invariant to be violated. Resulting HTML tree structures can be used to craft instances of status bar spoofing. To systematically derive these scenarios, a formal reasoning tool may be used to reason about the well-defined program invariant.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

FIG. 11 is a table of various locations and conditions for various address bar spoofing scenarios.

DETAILED DESCRIPTION

Figure 1:
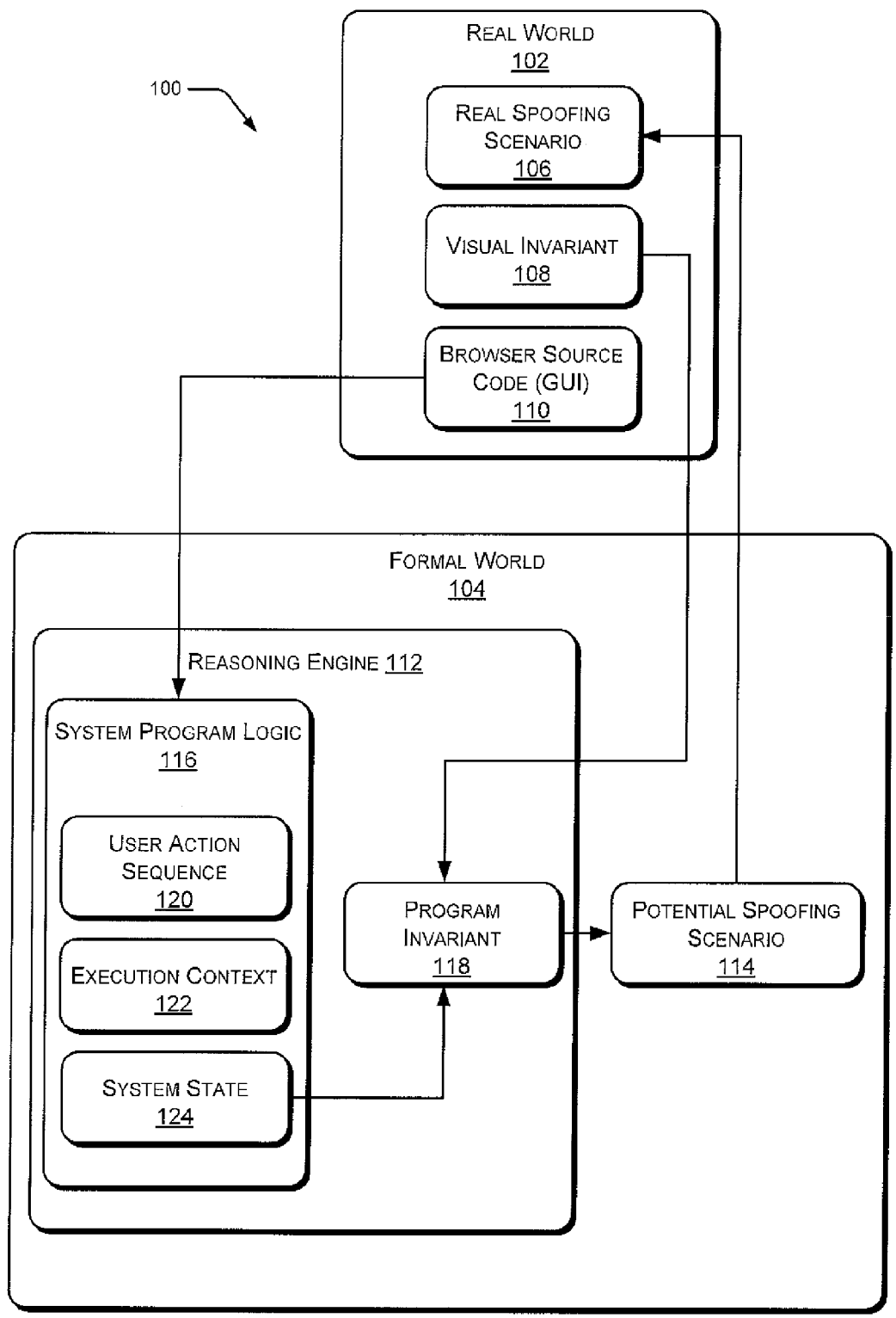
FIG. 1 is a block diagram of an exemplary system that may be implemented to identify GUI logic flaws.

The following disclosure describes systems and methods for identifying graphical user interface (GUI) logic flaws. While aspects of described systems and methods to systematically examine logic of graphic interface design or implementation to identify semantic flaws can be implemented in any number of different computing systems, environments, and/or configurations, embodiments are described in the context of the following exemplary architectures.

Overview

Formal analysis techniques may be used in reasoning about program invariants such as the impossibility of buffer overrun in a program, guaranteed mutual exclusion in an algorithm, deadlock freedom, secrecy in a cryptographic protocol, etc. Such program invariants are provided with a well-defined mathematical meaning. In contrast, in uncovering graphical user interface (GUI) logic flaws may involve reasoning as to what the user sees. Therefore, an "invariant" in a user's vision does not have an immediately obvious mathematical meaning. For example, a visual invariant of the status bar may be that if the user sees the address "foo.com" on a status bar before a mouse click, then it is expected that "click" action navigates to the page "foo.com". Therefore, a map is performed based on a visual invariant to a program invariant in order to apply formal reasoning.

Mapping between a visual invariant and a program invariant relies on the logic of the GUI implementation—for example, a browser's logic for mouse handling and page loading. An in-depth understanding of the logic or logic "problems" allows the ability to derive the program invariant. The source code of a browser may be studied and browser pseudo code may be implemented to capture such logic. Furthermore, "system state" may be specified, where system state may include the browser's internal state and also the user's memory. The sequence of the user actions may also be considered in understanding GUI logic problems. For example, the user may move and click the mouse, or open a new page, and each action can change the system state. Another factor to specify may be execution context of the system. For example, a web page is an execution context for mouse handling logic. Therefore, the same logic and the same user action when executed on different web pages can produce different results.

In certain exemplary embodiments, the methods described may include mapping a visual invariant, such as "the web site that a user navigates to must be the same as that indicated on the status bar", to a well-defined program invariant, such as a Boolean condition about user state and software state. The mapping is done based on an in-depth understanding of the source code of the software (e.g., browser software). This can lead to discovering possible inputs to the software which can cause the visual invariant to be violated. In the example of finding status bar spoofing scenarios, a goal may be to discover all HTML document tree structures that can cause the inconsistency between the URL indicated on the status bar and the URL that the browser is navigating to upon a click event; the resulting HTML tree structures can be used to craft instances of status bar spoofing. To systematically derive these scenarios, a formal reasoning tool may be implemented to reason about the well defined program invariant.

Exemplary System

FIG. 1 shows an example system 100 that may be implemented to identify GUI logic flaws. The system 100 may be part of a larger system such as developmental station or computing system. The system 100 includes a real world subsystem 102 and developmental or formal world subsystem 104. The real world subsystem 102 includes one or more real spoofing scenarios 106, one or more visual invariants 108, and browser (GUI) source code 110. The formal world subsystem 104 includes a reasoning engine 112 and one or more potential spoofing scenarios 114. The reasoning engine 112 further includes system program logic 116 and one or more program invariants 118. The system program logic 116 includes a user's action sequence 120, execution context 122, and system state 124.

The visual invariant 108 and source code 110 may be first mapped from the real world subsystem 102 to the formal world subsystem 104 by formally specifying them on the reasoning engine 112. The user action sequence 120, the execution context 122, and the system state 124 may also be formally specified. The reasoning engine 112 then performs mechanical reasoning to check whether the user action sequence 120 applied on a system running the system program logic 116 on the execution context 122 violates the program invariant 118. Each discovered violation is output as a potential spoofing scenario 114, which consists of the user action sequence 120, the execution context 122 and the system state 124 or inference steps for the particular spoofing scenario 114. The particular potential spoofing scenario 114 may then be mapped back to a particular real world spoofing scenario 106. Mapping back to the particular real world spoofing scenario 106 may include constructing a real web page that sets up the execution context 122 which lures a user to perform the action sequence 120.

Reasoning Engine

In order to uncover GUI logic flaws, a logical framework is implemented which includes the reasoning engine described above. The reasoning engine 112 may be based on "Maude"; however, it will become apparent that other systems and methods may also be implemented, such as theorem provers and model checkers. Maude is described herein as one exemplary implementation.

Below is a simple system specified using Maude: the states of a system are represented by symbolic expressions, and the system transitions are specified by rewrite rules indicating how a state is transformed into another. For example, in order to specify a 24-hour clock marking only the hours, a state constructor operator clock can be declared such that for example, clock(7) and clock(21) are two different clock states. In this example, there is one rewrite rule "ticking" the clock to the next hour. The clock system is specified as follows:

```
type CLOCK .
operator clock : Int -> CLOCK .
var T : Int .
rule clock(T)   =>    clock((T + 1) rem 24)
```

In the pseudocode above, Int is a built-in data type of integers, a new type CLOCK of clock states is defined, and the state constructor clock is declared as an operator that takes an Int and produces a CLOCK. The clock "tick" transitions are specified by a rewrite rule introduced with the rule keyword, which rewrites a given clock marking time T to one marking time ((T+1) rem 24), that is, the remainder of (T+1) divided by 24. For example, clock(23) will be rewritten to clock(0).

Once a system is specified, Maude's search command can be used to verify invariants. An invariant is a predicate that holds of an initial state and of states reachable from it. For example, if the initial state is clock(0), and the invariant to verify is that the times it marks will always be greater than or equal to 0 and strictly smaller than 24. An invariant is verified by searching for any states violating it, or in other words for states satisfying the negation of the invariant. This can be done with the following search command:

```
search clock(0) => clock(T) such that ((T < 0) or (T >= 24))
```

For complex situations, such as interactions between a user and a browser, formal verification may be needed in practice.

As further described below, a system such as Maude may be implemented such that for example, a browser's status bar and address bar logics are specified by rewrite rules by the system (e.g., Maude), and the search command is used to search for spoofing scenarios.

Status Bar Spoofing Based on Static HTML Example

Web attacks, such as browser buffer overruns, cross-site scripting attacks, browser cross-frame attacks and phishing attacks, may "trick" a user to navigate to a malicious universal resource locator (URL). Therefore, the user should know the target URL that is invoked by his actions (i.e., a user mouse click action). As discussed, the status bar is supposed to be a trustworthy information source to display the target URL information; however, the status bar may be spoofed. A status bar spoof is especially damaging if it can be constructed using only static markup language or hypertext markup language (HTML) (i.e., without any active content, such as Java script), because (i) email clients, e.g., Outlook and Outlook Express, render static HTML, and email is an important media to propagate malicious messages; and (ii) blogging sites and social networking sites (e.g., mySpace.com) usually sanitize user-posted contents to remove scripts, but allow static HTML. The following examples reference the use of HTML; however, other markup languages and other programming languages may be implemented.

The following is an example HTML source file as an example representation and the layout of an HTML page:

```
<html>
    <head><title>Page</title></head>
    <body>
        <a href="http://microsoft.com">
            <img src="a.jpg">
        </a>
        <button> My button </button>
    </body>
</html>
```

Figure 2A:
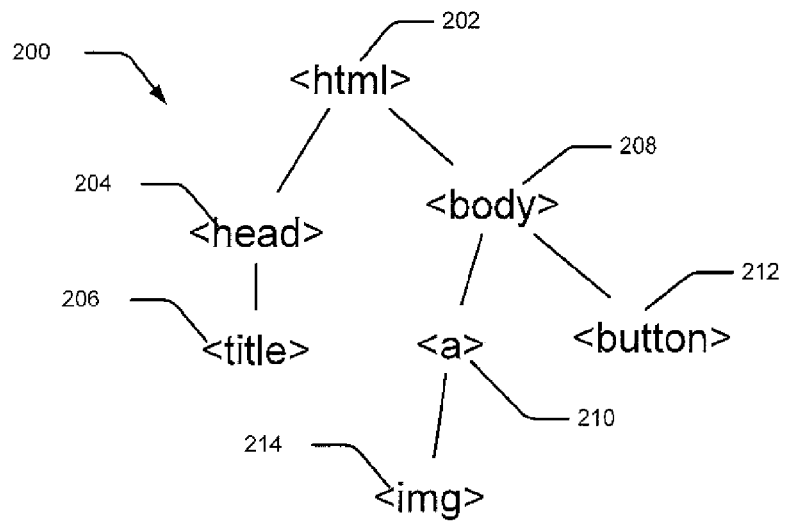
FIG. 2(A) is a document object model tree representing a markup language source file.
Figure 2B:
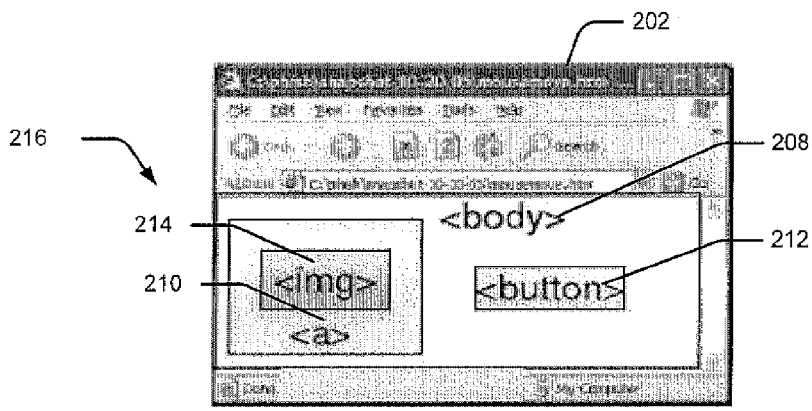
FIG. 2(B) is an element layout rendered by a browser based on a markup language source file.
Figure 2C:
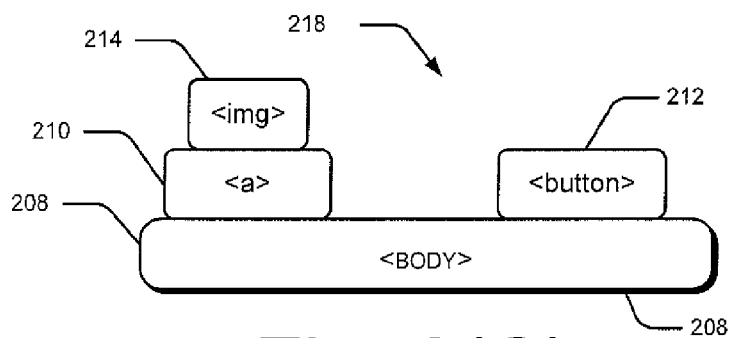
FIG. 2(C) is a graphical representation of an element stack based on a markup language source file.

FIG. 2(A) shows a document object model tree (DOM) 200 representing the HTML source file. The element <html> 202 represents the HTML file and includes a <head> 204, <title> 206, <body> 208, <a> 210, <button> 212, and <img> 214. The element <html> 202 can be considered as a tree root with the element <head> 204 as a subtree and the element <body> 208 as another subtree. The <body> 208 subtree is rendered in a browser's content area as shown in FIG. 2(B) which shows an element layout 216. Since status bar spoof is caused by user interaction with the content area, focus is made on the <body> 208 subtree. Conceptually, the elements of the <body> 208 subtree may be represented by the element stack shown in FIG. 2(C), where the elements are visually stacked upwards towards the user, with <body> 208 sitting at the bottom. In this HTML example, <a> 210 represents an anchor, and <img> 214 represents an image.

For status bar spoofing, mouse handling logic can play an important part. The following describes mouse handling logic. Such logic may be extracted from browser source code (i.e., browser source code 110).

A pointing device or mouse can generate several raw messages. When a user moves the mouse onto an element and clicks on the element, the sequence of raw messages can consists of several MOUSEMOVE messages, an LBUTTONDOWN (i.e., left button down) message, and an LBUTTONUP (i.e., left button up) message.

In the following example, core functions for mouse handling are described in the files OnMouseMessage and PumpMessage, which are not element specific. In addition, every element has specific virtual functions such as HandleMessage, DoClick and ClickAction to determine an element's behaviors.

A raw mouse message may invoke an OnMouseMessage function or call as follows:

```
OnMouseMessage(x,y,message) {
    element=HitTestPoint(x,y)
    if (element!= elementLastMouseOver)
        PumpMessage(MOUSELEAVE,
            elementLastMouseOver)
    PumpMessage(message, element)
    if (element!= elementLastMouseOver)
        PumpMessage(MOUSEOVER, element)
    elementLastMouseOver = element
}
```

The coordinates of the mouse are (x,y), and message can be either MOUSEMOVE, or LBUTTONDOWN, or LBUTTONUP. First, a HitTestPoint call is made to determine which element (denoted as "element" in the OnMouseMessage call) is immediately under the mouse. If "element" is different from elementLastMouseOver, which is the element immediately under the mouse in the most recent OnMouseMessage call, then a MOUSELEAVE message is pumped (i.e., sent) to elementLastMouseOver. Then the raw message (i.e., message) is pumped to "element". Finally, if "element" is different from elementLastMouseOver, a MOUSEOVER message is pumped to "element".

The following describes a "PumpMessage" function or call.

```
PumpMessage(message,element) {
    btn = element.GetAncestor (BUTTON))
    if (btn != NULL && message == LBUTTONUP )
        element = btn
    repeat
        BubbleCanceled = loopElement->HandleMessage(message)
        loopElement = loopElement->parent
    until BubbleCanceled or loopElement is the tree root
    if (message == LBUTTONUP)
        element->DoClick( )         //handle mouse single click
}
```

In the function PumpMessage, btn is the closest "button ancestor" of "element". If btn exists and the message is LBUTTONUP (i.e., a click), then "element" becomes the button btn. Any click on a descendant of a button may be treated as a click on the button.

Figure 3:
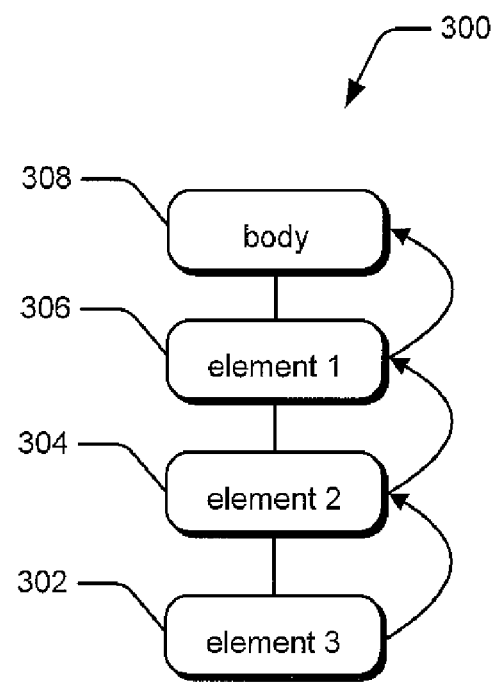
FIG. 3 is a block diagram of a message bubbling loop 300 that is performed when the browser receives a mouse message.

FIG. 3 shows a message bubbling loop 300 that is performed when "element" receives a mouse message. The message bubbling loop 300 begins at "element 3" 302. The virtual function HandleMessage of every element, i.e., "element 3" 302, "element 2" 304, "element 1" 306 along the DOM tree path is invoked. Each HandleMessage call can cancel or continue the message bubbling loop 300 (i.e., break out of or continue the message bubbling loop 300) by setting a Boolean BubbleCanceled. After the message bubbling loop 300 completes, if a message is LBUTTONUP, the virtual function DoClick of "element" is invoked to handle a mouse click.

Status Bar Spoofing Based on Static HTML Example

An object class may be implemented for each type of HTML element, such as "Anchor", "Form", "Button", "InputField", "Label", "Image", etc. These object classes inherit from an AbstractElement base class. Three virtual functions of AbstractElement, in particular HandleMessage, DoClick and ClickAction, may be defined to implement default behaviors of real HTML elements. AbstractElement::DoClick (i.e., function DoClick of AbstractElement) implements a loop to invoke ClickAction of each element along the DOM tree path, similar to the bubbling in PumpMessage. HandleMessage and ClickAction of AbstractElement are considered as "placeholders", since they simply return in order to continue the bubble.

Each HTML element class can override these virtual functions to implement its specific behaviors. A subset of virtual functions of the "Anchor", "Label" and "Image" elements are described in the following functions.

```
Bool Anchor::HandleMessage(message) {
    switch (message)
        case LBUTTONDOWN
            or LBUTTONUP:
                return true;   //cancel bubble
        case MOUSEOVER:
            SetStatusText(targetURL)
            return false;    //continue bubble
        Other:
            return false;
}
Bool Anchor::ClickAction( ) {
    FollowHyperlink(targetURL);
            return true;    // cancel bubble
}
Bool Label::HandleMessage(message)
    switch (message)
        case MOUSEOVER
            or MOUSELEAVE:
                return true; //cancel bubble
        Other:
            return false;
}
Bool Label::ClickAction( ) {
    pFor = GetForElement( )
    if (pFor != NULL)
        pFor->DoClick( );
    return true;
}
Bool Image::HandleMessage(message) {
    if a map is associated with this image
        MapTarget = GetTargetFromMap( );
        switch (message)
            case MOUSEOVER:
                SetStatusText(MapTarget)
                return true;
        else ...
}
Bool Image::ClickAction( ) {
    if a Map is associated with this image
        MapTarget = GetTargetFromMap( );
    FollowHyperlink(MapTarget);
        else pAnchor=GetContainingAnchor( );
            pAnchor->ClickAction( );
    return true;
}
```

Figure 4:
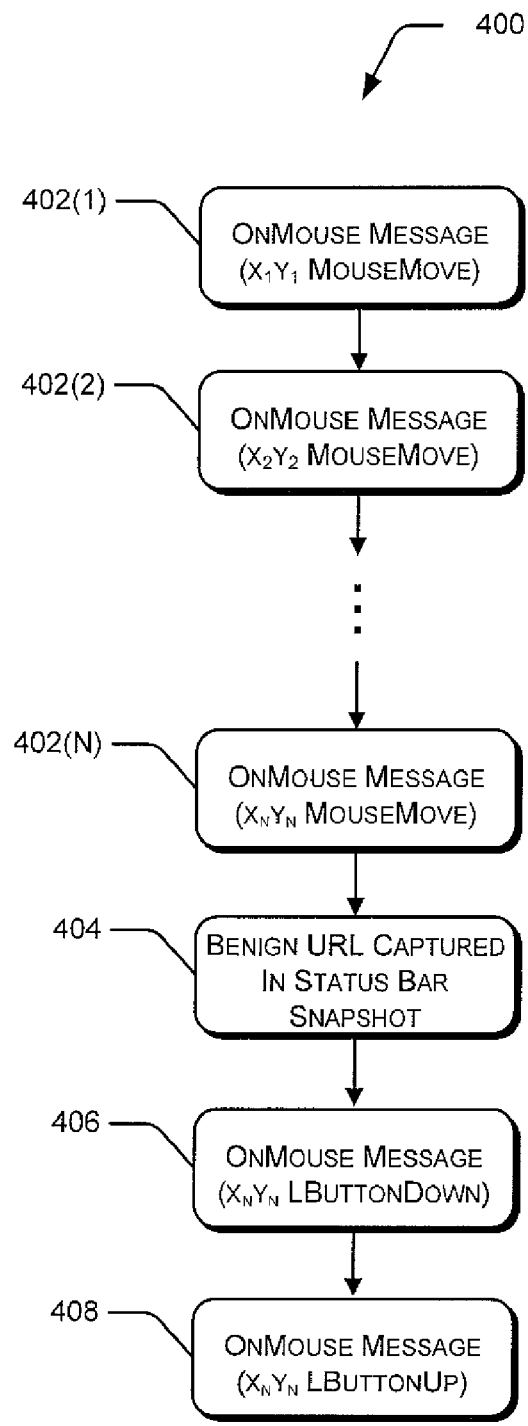
FIG. 4 is a flow diagram of a user action sequence.

The examples above demonstrate the complexity in mouse handling logic due to the intrinsic behavioral diversity of individual elements and the possible compositions. For example, when a mouse is over an anchor, the target URL of the anchor will be displayed on the status bar by calling SetStatusText, and the bubble continues, as indicated in Anchor::HandleMessage. When an anchor is clicked, FollowHyperlink is called to jump to the target URL, and the bubble is canceled, as indicated in Anchor::ClickAction. When the mouse is over a label, there is no SetStatusText call, and the bubble is canceled. According to the HTML specification, a label can be associated with another element in the page, which is called ForElement. Clicking on the label is equivalent to clicking on ForElement, as shown in Label::ClickAction. An image element can be associated with a map, which specifies different regions on the image with different target URLs. When the mouse is over a region, the URL of the region is set to the status bar, as indicated in Image::HandleMessage. When the mouse clicks on the region, a FollowHyperlink call is made, as indicated in Image::ClickAction. If an image is not associated with a map, then the URL of the containing anchor of the image (i.e., the closest ancestor anchor of the image on the DOM tree) determines the status bar text and the hyperlink to follow Formalization of Status Bar Spoofing FIG. 4 is a flow diagram 400 shows a user action sequence. In particular, flow diagram 400 illustrates a function level view of status bar spoofing. Several MOUSEMOVE actions 402(1) to 402(N) take place before the mouse stops at coordinate $(x_n, y_n)$. A spoof is systematically explored, considering that a web page can be arbitrarily complex and the user's action sequence as shown in the actions 402 in FIG. 4 can be arbitrarily long. Flow diagram 400 particularly illustrates how the function call level view of a status bar spoof is obtained, the browser receives a sequence of MOUSEMOVE messages on coordinates $(x_1,y_1)$ $(x_2,y_2)$ . . . $(x_n,y_n)$ (i.e., MOUSEMOVE actions 402), a user inspects the status bar and memorizes "benignURL" shown as block 404. Then, a LBUTTONDOWN and a LBUTTONUP messages are received as shown in block 406 and 408 respectively, resulting in a FollowHyperlink (maliciousURL) call.

An approach is based on "canonicalization", where canonicalization is a common form of abstraction used in formal reasoning practice to handle a complex problem space. A set of user action sequences is mapped to a single canonical action sequence. Furthermore, a set of web pages is mapped to a single canonical DOM tree. Since any instance in an original problem space may only trivially differ from its canonical form, the canonical space is explored to find "representative" instances.

For example, in order to perform canonicalization of the user action sequence shown in FIG. 4, the number of "MOUSEMOVE" actions before the mouse stops at $(x_n, y_n)$, is n−1. Although n−1 can be arbitrarily large, it can be mapped to a canonical sequence where the value n−1=1 represents the original sequence. Although, a MOUSEMOVE can potentially update the status bar, the status bar is a memory-less object (i.e., a whole sequence of updates on the status bar is equivalent to the latest update before the user inspection). Assuming the update is invoked by a MOUSEMOVE action at $(x_i, y_i)$, a canonical action sequence can specified in the following function, using a system such as Maude, where O1 and O2 are elements immediately under coordinates $(x_i, y_i)$ and $(x_n, y_n)$. An Action List (ActionList) or AL can be denoted as [$action_1$; $action_2$; . . . ; $action_n$].

operator CanonicalActionSeqence: Element Element -> ActionList .
rule CanonicalActionSeqence(O1,O2)
=>     [onMouseMessage(O1,MOUSEMOVE);
onMouseMessage(O2,MOUSEMOVE) ;
    Inspection ;
onMouseMessage(O2,LBUTTONDOWN);
onMouseMessage(O2,LBUTTONUP) ] .

DOM Tree Construction

DOM trees are constructed per execution context. Since the canonical action sequence may contain only two MOUSEMOVEs, there may be no need in generating a DOM tree with more than two branches—a third branch would be superfluous as it does not receive any mouse message. In this example, a module in the particular Maude model may be implemented to enumerate all one-branch DOM trees up to four elements and all two-branch DOM trees up to five elements (excluding the tree root <body> element); five elements being the current search space. The DOM trees are considered as canonical DOM trees. An example may include the following HTML element classes: "AbstractElement", "Anchor", "Button", "Form", "Image", "InputField" and "Label". Each particular element has attributes. For example, the following term represents an "Anchor" anchor O, whose parent is O':

<O|class:anchor, parent:O'>

HTML syntax has a set of restrictions for tree structures. For example, an anchor cannot be embedded in another anchor, an image and an input field can only be leaf nodes. Such restrictions may be specified as our tree enumeration rules.

System State and State Transitions

A system state includes the variables statusBar and the memorizedURL. State transitions are triggered by SetStatusBar calls and the user's Inspection action as below:

```
const Inspection : Action .
operator SetStatusText : URL -> Action .
vars AL : ActionList .
vars    Url, Url' : URL .
rule [SetStatusBar(Url) ; AL ] statusBar(Url') => [AL] statusBar(Url) .
rule    [Inspection ; AL] statusBar(Url) memorizedURL(Url')    =>
[AL] statusBar(Url) memorizedURL(Url) .
```

In the rules above, SetStatusText and Inspection are actions. "AL" is an arbitrary action list. Concatenating an action and AL using a semicolon also constitutes an action list. The first rule specifies that if the current action list starts with a SetStatusText(Url) call (followed by AL), and the status bar displays URL', then this call is removed from the action list, and the status bar is updated to Url. This means that after SetStatusText(Url) completes, the status bar is changed to Url. The second rule specifies that if statusBar displays Url and the memorizedURL is Url', and the action list starts with "Inspection", then Inspection is removed from the action list, and memorizedURL becomes Url. The semantics of Inspection are to copy statusBar to the user's memory (i.e., memorizedURL).

Modeling the Pseudo Code

The above described function or calls OnMouseMessage, PumpMessage, and the virtual functions of the "Anchor", "Label" and "Image" are typically a basic capability for most existing program analysis tools, because such functions contain only assignments, "if" statements, and loops with simple termination conditions, etc. Semantics of these program constructs may be implemented through Maude. The following are rules to specify HandleMessage and ClickAction of the Anchor element. vars M: Message O: Element AL:ActionList.

Rule 1
rule [AnchorHandleMessage(O,M) ; AL]    /* rule 1 */
=> [cancelBubble ; AL]
If M == LBUTTONUP or M == LBUTTONDOWN .
Rule 2
rule [AnchorHandleMessage(O,M) ; AL] < O | targetURL: Url , ...>
=> [setStatusText(Url) ; AL] < O | targetURL: Url , ... >
if M == MOUSEOVER .    /* rule 2 */

-continued

Rule 3
rule [AnchorHandleMessage(O,M) ; AL]    /* rule 3 */
=> [no-op ; AL]
if M is not LBUTTONUP, LBUTTONDOWN or MOUSEOVER .
Rule 4
rule [AnchorClickAction(O) ; AL] < O | targetURL: Url , ... >
=> [FollowHyperlink(Url) ; cancelBubble ; AL]
   < O | targetURL: Url , ... > .    /* rule 4 */

Rule 1 specifies that if an action list or AL starts with a AnchorHandleMessage(M,O) call, this call should rewrite to a cancelBubble, if M is LBUTTONUP or LBUTTONDOWN. Rule 2 specifies that if M is a MOUSEOVER, AnchorHandleMessage(M,O) should rewrite to setStatusText(Url), where Url is the target URL of the anchor. For any other type of message M, AnchorHandleMessage(M,O) should rewrite to no-op to continue the bubble, which is specified by rule 3. Rule 4 rewrites AnchorClickAction(O) to the concatenation of FollowHyperlink(Url) and cancelBubble, where Url is the target URL of the anchor. Other elements may be modeled by similar such rules.

The Program Invariant

The program invariant to find spoofs is specified by the following "search" command:

```
const maliciousUrl , benignUrl , empty : URL.
vars O1, O2: Element Url: URL AL: ActionList .
search CanonicalActionSequence(O1,O2)
    statusBar(empty)
    memorizedUrl(empty)
    => [FollowHyperlink(maliciousUrl) ;
AL] statusBar(Url) memorizedUrl(benignUrl) .
```

The above invariant provides a well-defined mathematical meaning to status bar spoof: "the initial term CanonicalActionSequence(O1,O2) statusBar(empty) memorizedUrl (empty) can rewrite to the term [FollowHyperlink(maliciousUrl); AL] statusBar(Url) memorizedUrl(benignUrl)", which indicates that the user memorizes benignURL, but FollowHyperlink(maliciousUrl) is the next action to be performed by the browser.

Spoofing Scenarios Suggested by the Results

Figure 5:
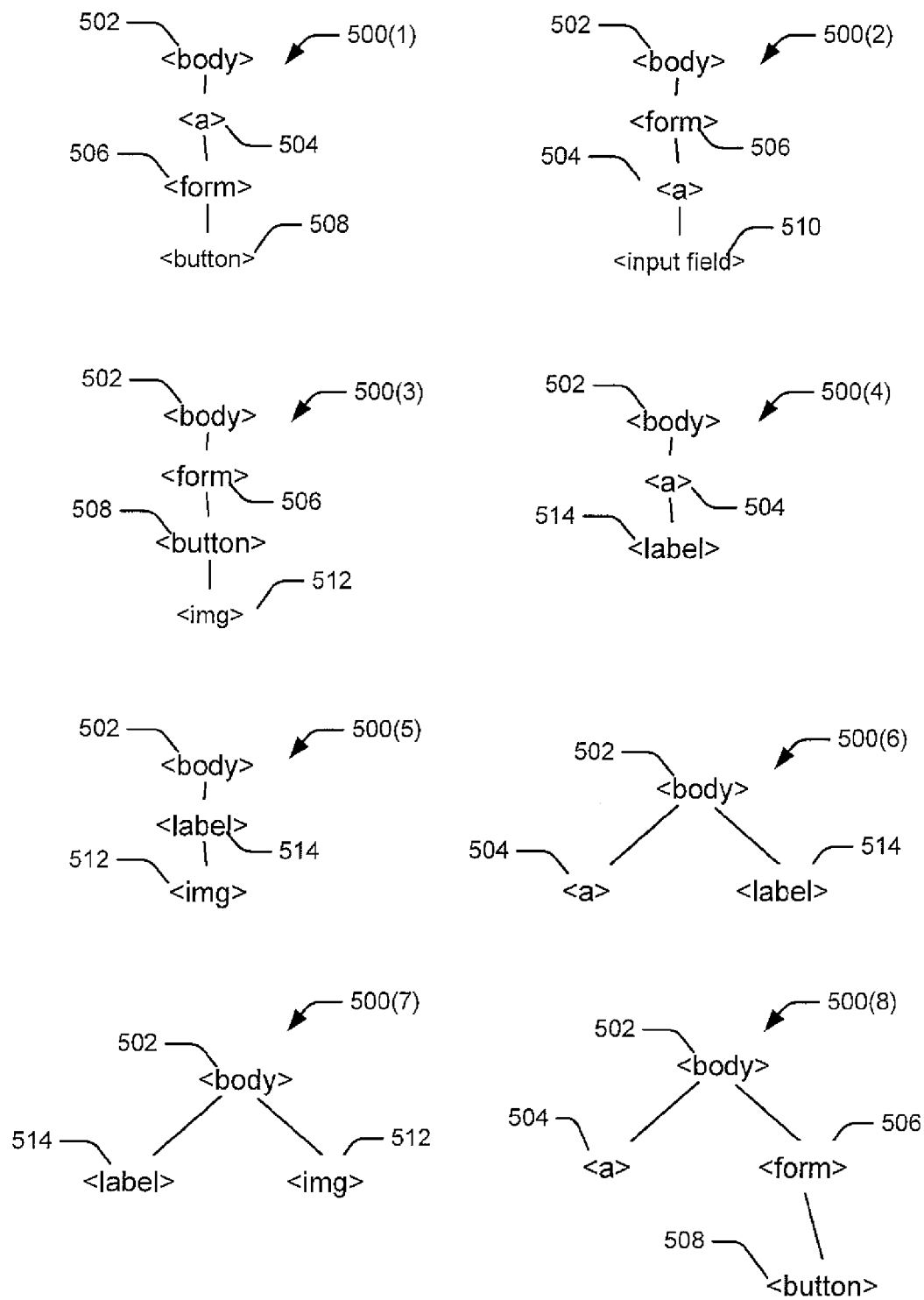
FIG. 5 are exemplary document object model trees that cause status bar spoofing scenarios.

FIG. 5 shows examples of DOM trees 500. In particular, DOM trees 500(1) to 500(8) are example DOM tree structures that may be output in by the search command described above. The element <body> 502 is the root of the DOM trees 500 and may have one or more of the following leaves: <a> 504, <form> 506, <button> 504, <input field> 510, <img> 512, and <label> 514.

The following function describes DOM tree 500(2):

```
<form action="http://foo.com/" >
    <a href="http://microsoft.com">
        <input type="image" src="faked.jpg">
    </a>
</form>
```

Figure 6:
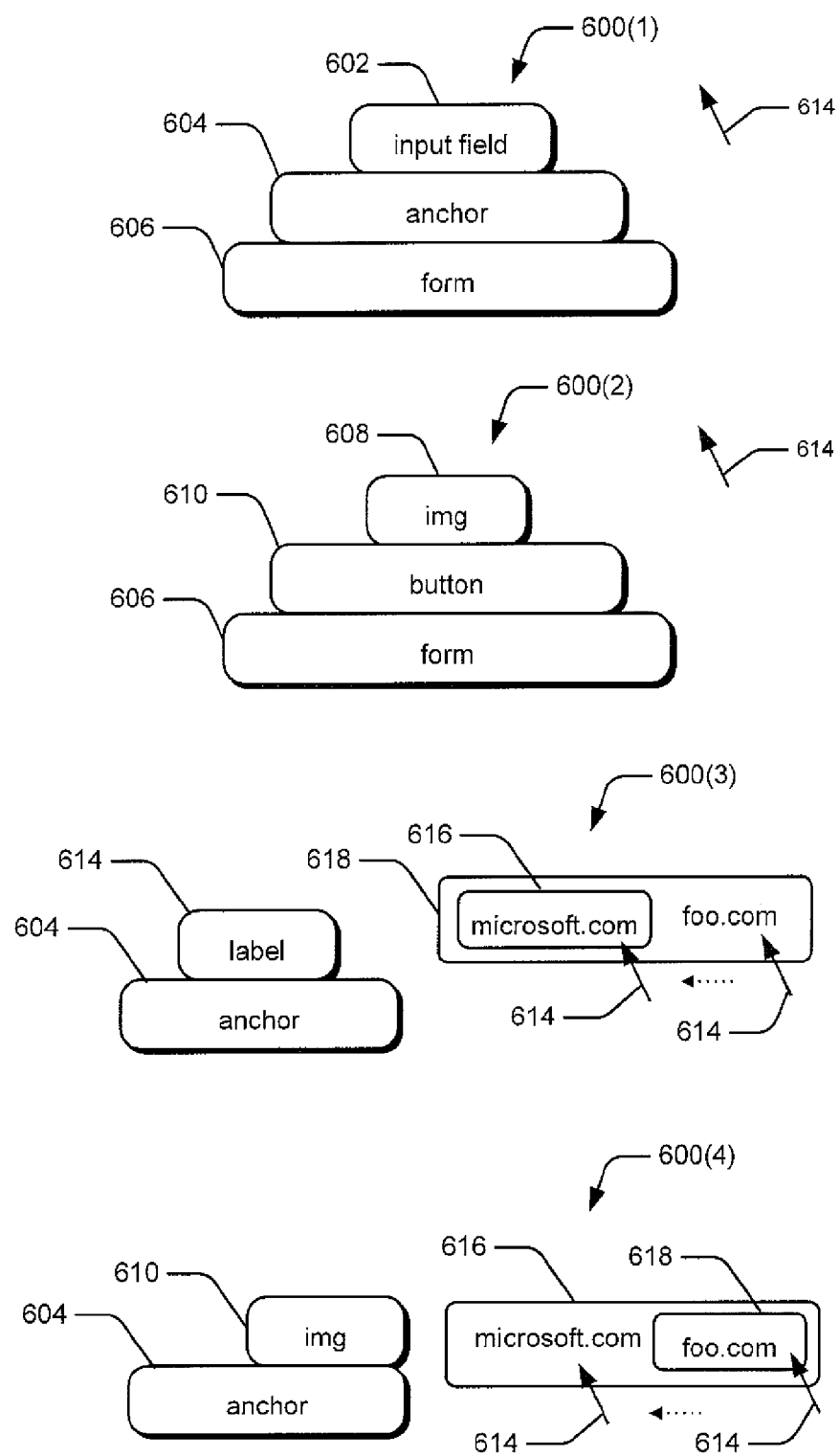
FIG. 6 are element-stack representations of document object model trees.

FIG. 6 shows a graphical representation of DOM trees. In specific, 600(1) represents DOM tree 500(2); 600(2) represents DOM tree 500(3); and 600(3) represents DOM tree 500(4). In particular, the elements "input field" 602, "anchor" 604, "form" 606, "img" 608, "button" 610, "label" 614 are illustrated. A graphical icon in the form of a mouse arrow 614 is shown.

The scenario of DOM tree 500(2) is represented by the following function:

```
<form action="http://foo.com/" >
    <a href="http://microsoft.com">
        <input type="image" src="faked.jpg">
    </a>
</form>
```

The scenario DOM tree 500(2) has an input field which is a picture faked.jpg visually identical to an underlined text "http://microsoft.com". When the mouse is over it, the HandleMessage of each element is called to handle the MOUSEOVER message that bubbles up to the DOM tree root. Only the anchor's HandleMessage writes its target URL microsoft.com to the status bar, but when the input field is clicked, its ClickAction method retrieves the target URL from the form element, which is foo.com.

The scenario of DOM tree 500(3) is represented by the following function:

```
<form action="http://foo.com/" >
    <button type=submit>
        <img src="faked_link.jpg" USEMAP= "msft1">
    </button>
</form>
```

The scenario of DOM tree 500(3) is different than that of the scenario of DOM tree 500(2). An <img> element is associated with a map "msft1", and is on top of a button. The target URL of "msft1" is set to "http://microsoft.com". When <img> gets a MOUSEOVER, it sets the status bar to microsoft.com and cancels the bubble. When the mouse is clicked on <img>, because <img> is a child of <button>, the click is treated as a click on the button, according to the implementation of PumpMessage( ). The button click leads to a navigation to foo.com The scenario of DOM tree 500(4) contains a label embedded in an anchor as shown in 600(3). When the mouse is moved toward the label, it must first pass over the anchor, and thus sets microsoft.com 616 on the status bar. When the label is clicked, the page is navigated to foo.com 618, because the label is associated with an anchor 604 of foo.com 618. An opposite scenario is shown 600(4). Graphical representation 600(4) shows an HTML page to lure a user to move over an image (child) and click on the label (parent). The <img> is associated with a map that sets microsoft.com 616 to the status bar when the mouse 614 is over it. Note that because HTML syntax only allows an image to be a leaf node, the parent-child relation in this example is mandatory. Therefore scenario 500(4) and 500(5) are significantly different.

The scenarios of DOM trees 500(6), 500(7), and 500(8) further illustrate varieties of DOM trees and layout arrangements that can be utilized in spoofing. For example DOM tree 500(6) two leafs <a> 504 and <label> 514 side-by-side; DOM tree 500(8) can implement a structure similar to Cascading Style Sheets (CSS).

Address Bar Spoofing

Address bar spoofing is another serious GUI logic flaw which can fool users to trust a current page when it comes from an un-trusted source. When combined with a status bar spoof, this becomes a powerful security threat.

Figure 7:
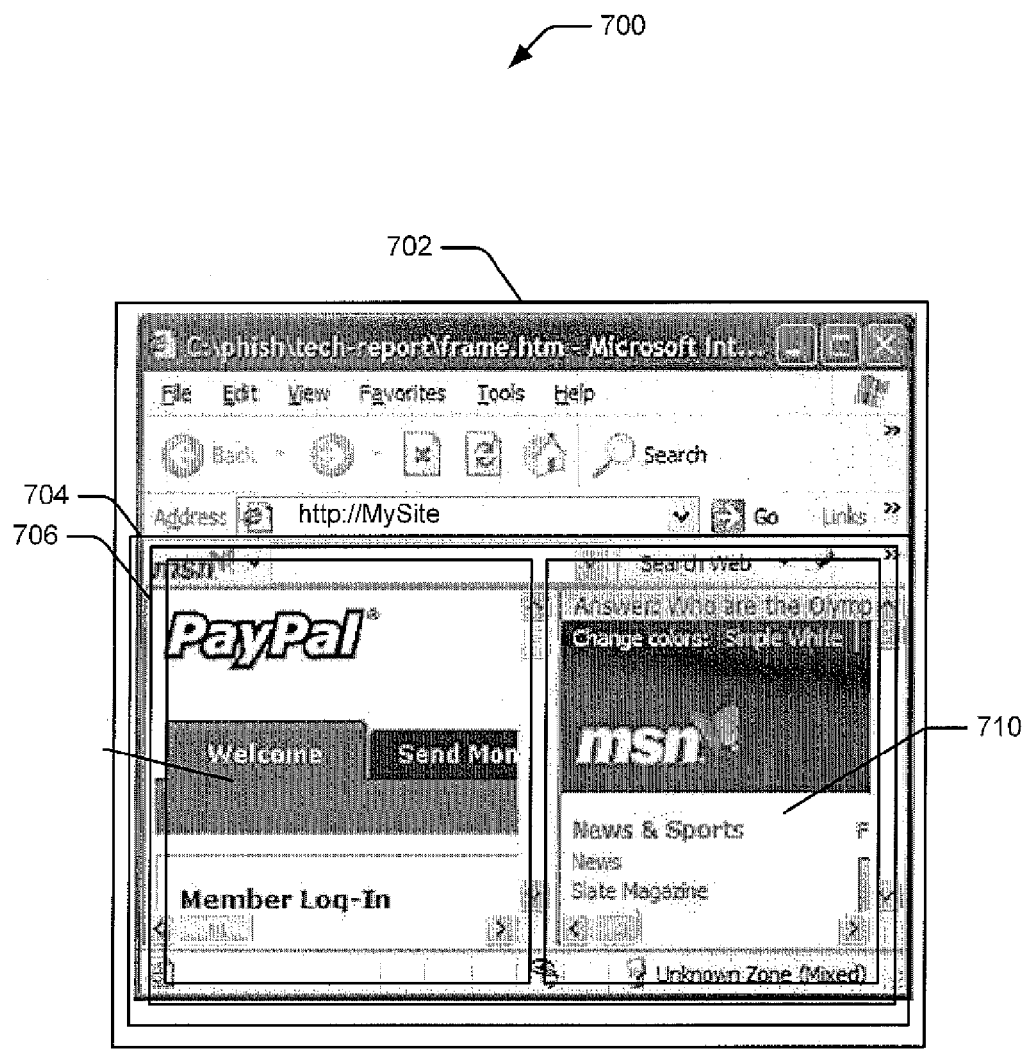
FIG. 7 is a browser window containing multiple frames.

FIG. 7 shows webpage 700 in which multiple frames are hosted. In particular, a browser 702 displays a page from an address http://MySite. A browser process can create multiple browsers, where each browser is implemented as a thread. A browser may be built on the Object Linking and Embedding or OLE framework, in which the browser is a container (including a title bar, an address bar, a status bar, etc) hosting a client document in the content area.

When a client document is of an HTML format, it may be called a trident object 704. A trident 704 can host multiple frames, each displaying an HTML page downloaded from a URL. An HTML page is stored as a markup data structure. A markup consists of the URL and the DOM tree of the content from the URL. The top level frame or the frame associated with the entire content area is called the primary frame 706 of the trident 704. In particular, in this example, the trident 704 has three frames: the primary frame or top level frame 706; a frame 708 from PayPal.com and frame 710 from MSN.com. Each of the frames 706, 708, and 710 is associated with a current markup and, during the navigation time, a pending markup. Upon navigation completion, the pending markup is switched in and becomes the current markup. Informally, the program invariant of the address bar correctness is that: (1) the content area is rendered according to the current markup of primary frame 706, and (2) the URL on the address bar is the URL of the current markup of primary frame 706.

Overview of the Logic of HTML Navigation

Using HTML as example, HTML navigation can consist of multiple tasks, such as loading HTML content, switching markup, completing navigation and rendering a page. A trident, such as trident 704, can have an event queue to schedule such tasks. The event queue has a mechanism for handling events asynchronously, so that the browser is not blocked to wait for the completion of the entire navigation.

Different types of navigation may be studied. The following three examples of navigation are discussed: (1) loading a page into the current trident; (2) traveling in the history of the current trident; and (3) opening a page in a new trident.

Figure 8:
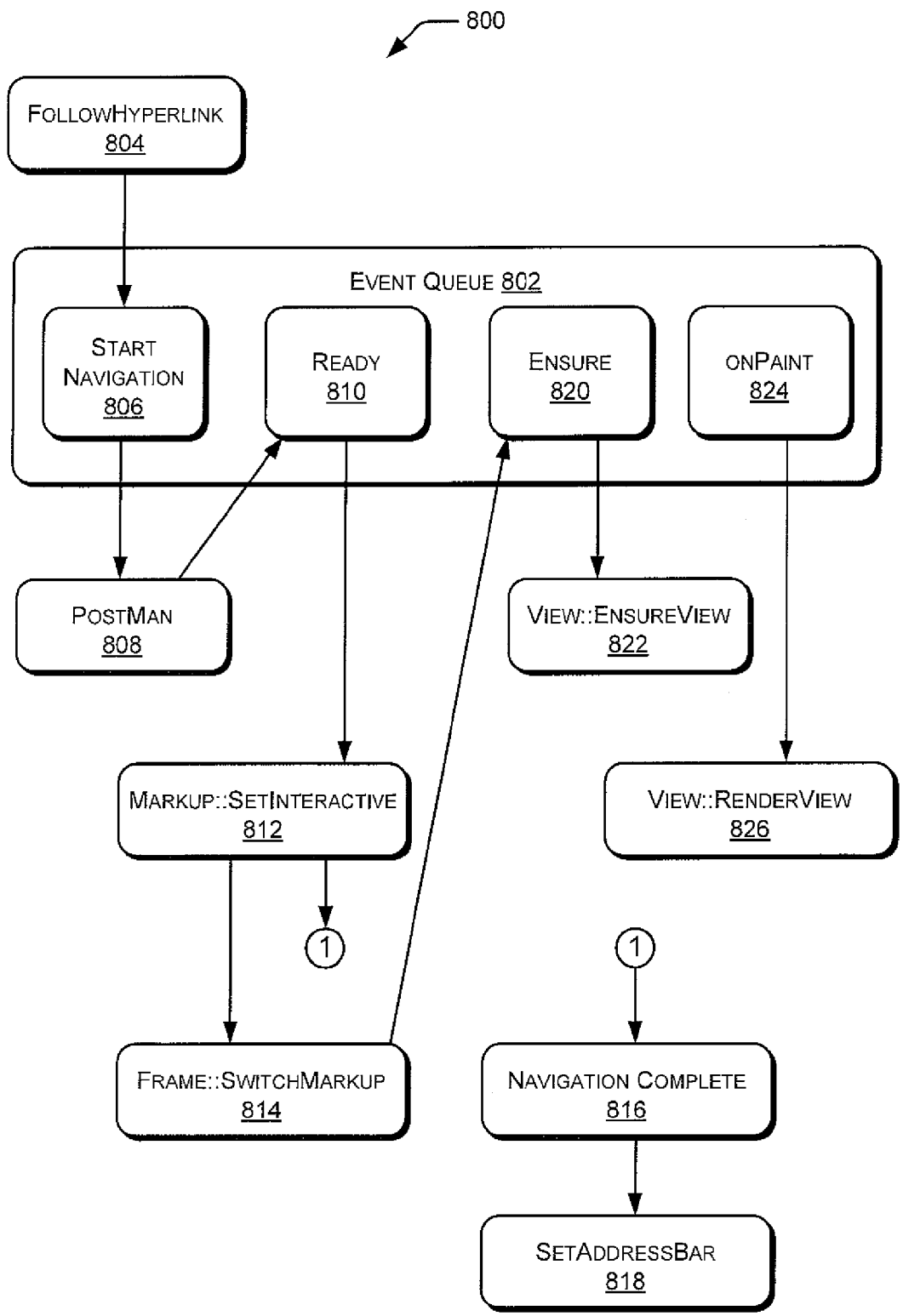
FIG. 8 is a flow diagram of an event sequence which loads a page in a current trident.

FIG. 8 shows an event sequence 800 of loading a page in a current trident. The event sequence includes an event queue 802. The event sequence 800 is initiated by a FollowHyperlink command 804, which posts a start navigation event 806 in the event queue 802. A function PostMan 808 is responsible for downloading new HTML content to a pending markup. Event ready 810 is posted to invoke Markup::SetInteractive 812, to make the downloaded contents effective. Markup::SetInteractive 812 first invokes Frame::SwitchMarkup 814 to replace the current markup with the pending markup, and then calls NavigationComplete 816. If the downloaded markup belongs to a primaryFrame, a function SetAddressBar 818 is invoked to update its address bar. An Ensure 820 event is posted by Frame::SwitchMarkup 814, which invokes View::EnsureView 822 to construct a View structure containing element layouts derived from the current markup of the primaryFrame. An operating system or OS may periodically post an OnPaint 824 event to paint the content area by calling View::RenderView 826.

Figure 9:
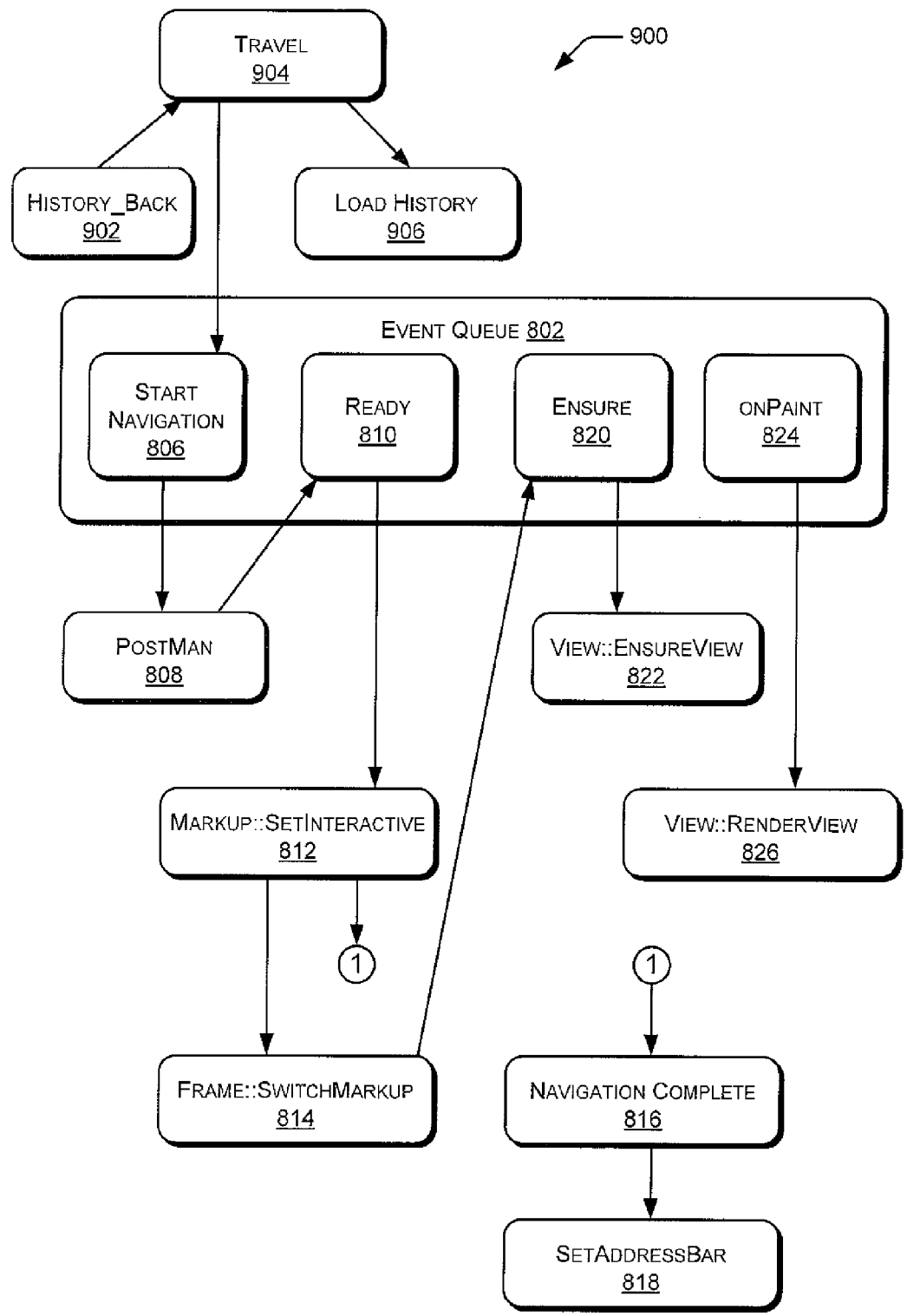
FIG. 9 is a flow diagram of an event sequence of a history travel.

FIG. 9 shows a flow diagram of an event sequence 900 of a history travel. History_Back 902 and Travel 904 look up a history log or call Load History 906 to initialize the navigation (i.e., posts to start navigation event 806). PostMan 808, in this case, loads HTML contents from a persistent storage in local storage (e.g., a hard disk), rather than from the Internet. The remaining portion of the sequence is similar to the sequence of loading a new page.

Figure 10:
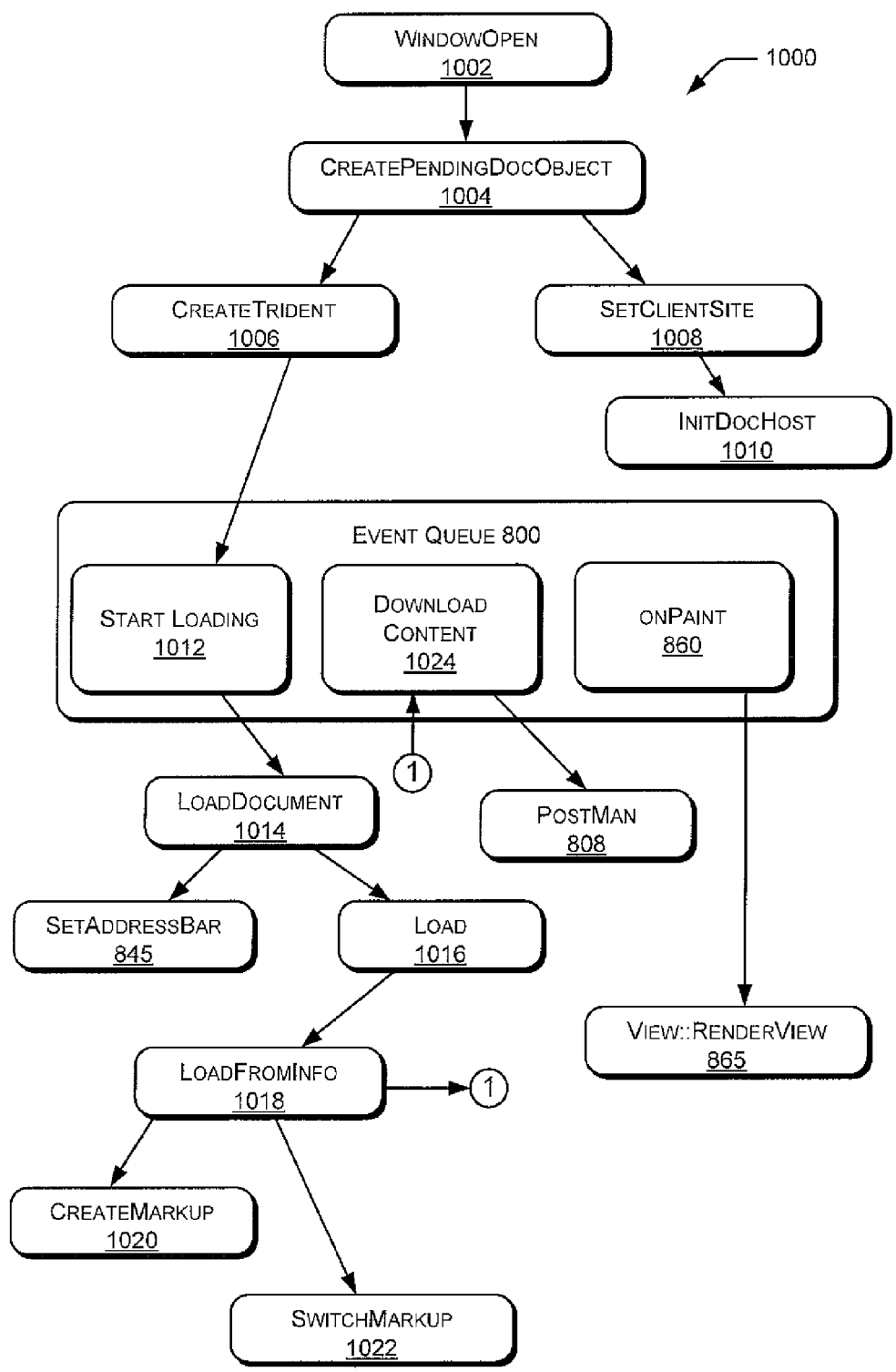
FIG. 10 is a flow diagram of an event sequence of loading a new page into a new trident.

FIG. 10 shows a flow diagram of an event sequence 1000 of loading a new page into a new trident. WindowOpen 1002 is the starting point. WindowOpen 1002 calls the function CreatePendingDocObject 1004 to create a new trident (i.e., CreateTrident 1006). CreatePendingDocObject 1004 then calls SetClientSite 1008. SetClientSite 1008 prepares a number of Boolean flags as the properties of the new trident, and calls InitDocHost 1010 to associate the trident with the browser (i.e., the container). The new trident at this moment is still empty. The Start Loading 1012 event invokes LoadDocument 1014 which first calls SetAddressBar 845 to set the address bar and then calls Load 1016 which calls LoadFromInfo 1018. CreateMarkup 1020 and SwitchMarkup 1022 are called from LoadFromInfo 1018 before posting a download-content 1024 event to download the actual content for the newly created markup. The function PostMan 808 does the downloading as above. The remaining of the sequence 1000 is similar to event sequences 800 and 900.

Formalization of the Navigation Behaviors

The following looks at modeling the system and system state. Because an address bar spoofing is by definition the inconsistency between the address bar and the content area of the same browser, "spoofability" is a property of the logic of a single browser; however, this does not mean that only one browser is allowed in a spoofing scenario. In other words, there can be other browsers to create a hostile execution context to trigger a logic flaw in one particular browser. Nevertheless, in this example, it is only needed to model the system as one browser and prove its logical correctness (or uncover its flaws), and model other browsers as part of the execution context.

A system state of a browser includes the URL displayed in the address bar, the URL of the View in the content area, a travel log, and the primary frame. For the Maude system and language, a set of Frames and a set of Markups are further defined. For example, if Markup m1 is downloaded from URL u1, and it is the currentMarkup of frame f1, where f1 and u1 can be specified as:

```
<f1 | currentMarkup: m1, pendingMarkup: ...>
<m1 | URL: u1, frame: f1, ...>
```

A system state may also include a function call queue and an event queue. The function call queue may be denoted as $[call_1; call_2; \ldots; call_n]$, and the event queue may be denoted as $\{event_1; event_2; \ldots; event_n\}$.

Boolean flags can affect the execution path, where such Boolean flags constitute an execution context of the system. Rules may be defined to assign both true and false values to the Boolean flags. Therefore the search command explores both paths at each branch in the pseudo code. The assignments of the Boolean flags, combined with the function call sequence, constitute a potential spoofing scenario. These may include false positive scenarios, as discussed above in reference to FIG. 1, the mapping a potential spoofing scenario back to the real world is of value.

Three types of actions are shown in FIGS. 8, 9, and 10: calling a function, invoking an event handler, and posting an event. A function call is implemented as a term substitution in the function call queue. For example, the function call SetInteractive is specified by the following rule, where F is the frame of Markup M, and SetInteractive(F) can conditionally rewrite to SwitchMarkup(M,F) (if BOOLEXP1 is false) followed by NavigationComplete(F) (if BOOLEXP2 is true). The following is pseudo code and a rewrite rule of the function call SetInteractive.

```
MARKUP::SetInteractive( ) {
    if (BOOLEXP1) return;
    this->frame->SwitchMarkup(this);
    if (BOOLEXP2) NavigationComplete(frame)
}       var F: Frame M: Markup FQ: FunctionQueue
rule [SetInteractive(M) ; FQ] < M | frame: F , ... >
=> [(if BOOLEXP1 ≠ true then SwitchMarkup(M,F) else noop fi) ;
    (if BOOLEXP2 = = true then NavigationComplete(F) else noop fi) ;
    FQ] < M | frame: F , ... >
```

Posting of an event happens by appending the event to the event queue, for example, the function FollowHyperlink as shown below, is specified by removing itself from the function queue and adding a startNavigation event to the end of the event queue.

```
var U:Url F:Frame FQ: FunctionQueue EQ: EventQueue
rule [FollowHyperlink(U, F) ; FQ] { EQ }
=> [FQ] { EQ ; startNavigation(U, F) } .
```

Another type of action is the invocation of an event handler. An event can be invoked when its previous event handler returns. To model this restriction, a rule of an event handler invocation specifies that the first event in the event queue can be dequeued and translated into a function call when the function call queue is empty. Below is a rule to specify the handling of the ready event, which invokes the handler SetInteractive.

```
var EQ: EventQueue
rule [empty] { ready(M) ; EQ }
=> [SetInteractive(M)] { EQ }
```

To model address bar correctness a program invariant is provided, where the program invariant of the address bar is defined by the following rule:

```
vars U: URL F: Frame M: Markup
rule goodState (addressBar(U) urlOfView(U) urlPaintedOnScreen(U)
primaryFrame(F)
    < F | currentMarkup: M , ...> < M | url: U , ...>)
=> true .
```

According to the definition of this rule, a good state is a state where the URL on the address bar matches the URL of the view and is also the URL of the content which is painted on a screen. Furthermore, the URL is the URL of the currentMarkup of the primaryFrame. Therefore, a spoofing state (defined as "not goodState") is one where there is a mismatch between any of these URLs.

As to an initial system state, the search command can start from the following rule initialState:

```
const f1 : Frame   m0: Markup   url0: URL   empty: EventQueue
rule initialState
=> { empty } [ empty ]
    primaryFrame(f1)   < f1 | currentMarkup: m0 , pendingMarkup: nil >
< m0 | url: url0 , frame: f1 >
    addressBar(url0) urlOfView(url0) urlPaintedOnScreen(url0) .
```

In this initial system state, both the event queue and the function call queue are empty; the primaryFrame is f1; the currentMarkup of f1 is m0; the pendingMarkup of f1 is uninitialized; m0 is downloaded from URL0; the address bar displays URL0; the View is derived from URL0; and the View is painted on the screen.

As to a user action sequence, in the scenario of an address bar spoofing, the user's action is to access an untrusted HTML page. The page can contain a Java script calling the following navigation functions: FollowHyperlink, History-Back and/or WindowOpen. The behavior of the Java script is modeled by a rule that conditionally appends a navigation function to the function list. Each function generates a sequence of events as specified by the function semantics. In the case of Maude or other modeling system and language, all possibilities of interleaving event sequences can be exhaustively searched, because Maude explores all viable rewrite orders.

Potential Spoofing Scenarios in the Results

The search command described above can be used to find all execution paths in the model that start with the initial state and finish in a bad state. The search may be performed on two interleaving sequences, for example two FollowHyperlinks; two History_Backs; one FollowHyperlink with one History_Back; and one WindowOpen with one FollowHyperlink.

FIG. 11 shows a table 1100 of various locations and conditions. Table 1100 includes a column identified by a heading number 1102, a column identified by a heading location 1104, and a column identified by a heading condition 1106. The 18 example entries 1108(1) to 1108(18) may be suggested in one execution context of a potential spoofing scenario suggested in Maude or similar model. Certain function names in the location column 1104 are shown in FIGS. 8, 9, and 10; however, a model can be more detailed and include numerous functions.

Table 1100 provides a roadmap for a systematic investigation by firstly verifying that when each of the conditions 1106 is manually set to true in the corresponding location using a debugger, the real browser executable will be forced to take an execution path leading to a stable bad state. Therefore, an investigation is focused on these conditions. Secondly other conditions that are present in the pseudo code are not listed in table 1100, e.g., those in SwitchMarkup, LoadHistory and CreateTrident, since search result may have excluded them from being potential spoofing conditions.

The following describes entries 1108(2), 1108(9), 1108(11), and 1108(18) as examples in constructing real spoofing scenarios. Scenarios based on entries 1108(2) and 1108(9), and their conditions 1106 may be considered entries based on silent return conditions. Function call traces associated with the conditions of entry 1108(2) (i.e. GetPFD(url)=NULL) and entry 1108(9) (i.e. CurrentURL=NULL) indicate similar scenarios: there are silent-return conditions along a call stack of an address bar update. If any one of these conditions is true, the address bar will remain unchanged, but the content area will be updated. Therefore, if the script first loads "paypal.com" and then loads "evil.com" that triggers the condition, the user will see "paypal.com" on the address bar and the content area from evil.com.

The condition of entries 1108(2) and 1108(9) may be true when the URL of the page is of a certain special format. In each case, the function cannot handle the special URL, but instead of asserting the negation of the condition, the function silently returns when the condition is encountered. These two examples demonstrate a challenge in addressing atomicity in graphical interface design—once the pending markup is switched in, the address bar update should succeed. No "silent return" is allowed. Even in a situation where the atomicity is too difficult to guarantee, at the least there should be an assertion to halt the browser.

Figure 12:
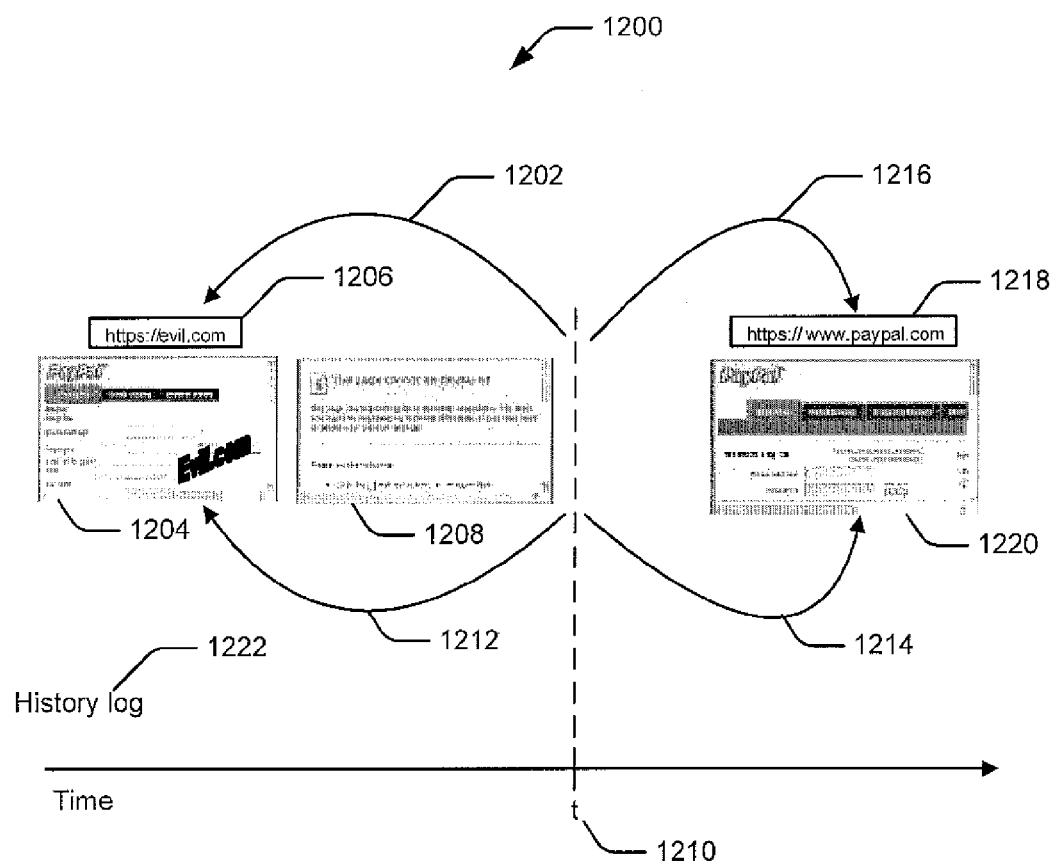
FIG. 12 is a flow diagram of a spoofing scenario based on a race condition.

Entry 1108(11) is a scenario based on a race condition. The condition of entry 1108(11) is associated with a function call trace which indicates a situation where two frames co-exist in a trident and compete to be the primary frame. FIG. 12 shows a flow diagram this scenario.

The malicious script first loads a page 1204 from https://evil.com 1206 which is a phishing page. Then it intentionally loads an error page 1208 in order to make condition of entry 1108(11) true when LoadHistory( ) is called later. The race condition is exploited at time t 1210, where two navigations 1212 and 1214 start at the same time. The following event sequence results in a spoof: (1) the trident starts to navigate 1216 to https://paypal.com 1218. At this moment, the primary frame is 1220; (2) the trident starts to travel back in the history log 1222. Because condition of entry 1108(11) is true, i.e., HTMLDoc=NULL, a new frame 1204 is created as the primary frame. This behavior is according to the logic of LoadHistory( ); (3) the markup of https://evil.com 1206 in the history log 1222 is switched in to frame 1204; (4) illustrated by 1202, an address bar update is made to put https://evil.com 1206 onto the address bar; (5) the downloading of the https://paypal.com page is completed, so its markup is switched into the frame 1220, where the frame 1220 is not the primary frame any more and will not be rendered in the content area; (6) the address bar is updated to https://www.paypal.com 1218 despite the fact that the frame 1220 is no longer the primary frame. When all these 6 events of the preceding event sequence, occur in such an order, the user sees http://www-.paypal.com on the address bar, but the evil.com page 1204 in the content area. A secure socket layer (SSL) certificate may also be spoofed in this situation.

This race condition of entry 1108(11) can be exploited in various existing browsers and their particular versions, and succeeds with a high probability; however the race condition may not succeed in every trial because event (5) and event (6) may occur before event (3) and event (4), in which case the users sees the evil.com page 1204 with https://evil.com 1206 on the address bar.

Scenario based on the condition of entry 1108(18) (i.e., condition is a hostile environment) is described as follows. The conditions of entries 1108(2) and 1108(9) 2 exploit the failure of the address bar update, and condition of entry 1108(18) targets the failure of the content area update. This scenario depends on the condition of entry 1108(18) (i.e., RSFC=NULL). This can be true when a malicious script creates a hostile execution environment and launches a browser. As a result, the user will see for example, "http://cnn.com" (i.e., a correct URL) displayed on the address bar and the content from https://evil.com (i.e., a malicious URL) remaining in the content area. Similar to the scenarios described above, this scenario demonstrates the importance of atomicity in graphical interface implementations. In addition to the correctness of the internal logic of a browser, this spoofing scenario emphasizes the resilience against a hostile execution environment.

Exemplary Methods

Exemplary methods for uncovering GUI logic flaws are described with reference to FIGS. 1 to 12. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 13:
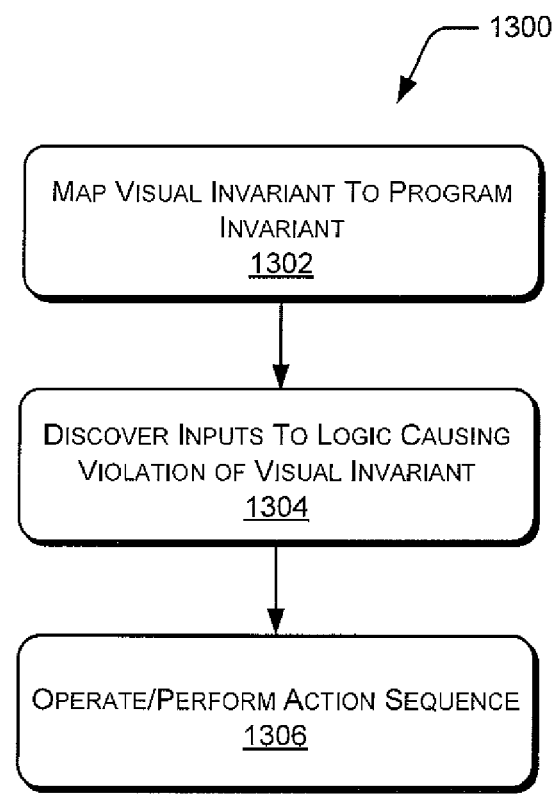
FIG. 13 is a flow diagram of uncovering logic flaws as to a graphical user interface.

FIG. 13 illustrates an exemplary method 1300 for uncovering logic flaws as to a graphical user interface. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1302, mapping is performed with a visual invariant to a program invariant. The visual variant is an object that is seen by a user, such as a page or website, or an element (object) in the page or website, an address that is presented on an address bar, etc. The program invariant is a well defined program invariant. Examples of program invariants include Boolean conditions about user state and software state. The program invariant may be further found in a logic or software of an interface (e.g. GUI) that includes the program invariant, where the program invariant relies on the logic (software) of the interface's implementation. For example, a browser's logic for mouse handling and page loading.

At block 1304, discovering is performed as to possible inputs to the logic or software which can cause the visual invariant to be violated. In an embodiment, the discovering includes all document object model tree structures that can cause the inconsistency between an address (URL) indicated on a status bar and the URL that a browser is navigating to upon a click event, where the resulting tree structures can be used to craft instances of status bar spoofing. Also, as discussed above, instances of address bar spoofing may also be crafted.

At block 1306, initiating an action sequence is performed, where discovering performed at block 1304 is directed to the action sequence. The action sequence may be a canonical action sequence as described above, and the tree structures in bock 1304 may be canonical DOM trees.

Figure 14:
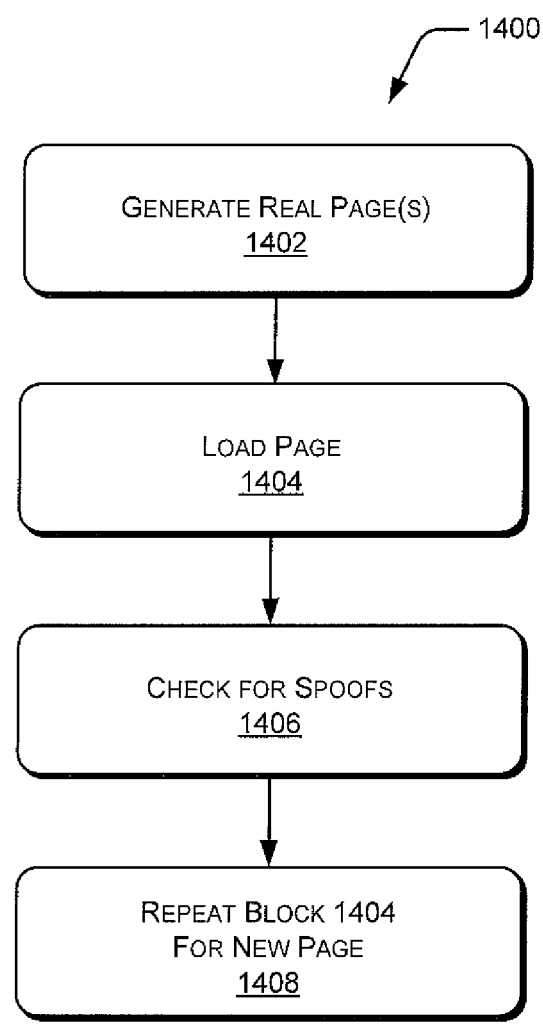
FIG. 14 is a flow diagram for discovering spoofing scenarios.

FIG. 14 illustrates an exemplary method 1400 for discovering status bar or address bar spoofs. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

The techniques described above illustrate that status bar logic can be systematically explored. As discussed, the Maude model, system and language is one tool; however, the there are other tools, languages, and models that may be implemented. For example, a model checker, a theorem prover, and a binary code instrumentation tool may be implemented, such as "Detours".

The basic idea is that since a program invariant is known, and it is also known how to generate canonical user action sequences and canonical DOM trees, it is possible to generate real canonical HTML pages and pump real mouse messages to test the real browser status bar implementation.

The advantage of an automated approach is that it does not require manual modeling of the behaviors of each element (e.g., HTML element), and therefore the process of redoing the model (i.e., remodeling) for different patch levels of the browser can be eliminated. Furthermore, the automated approach can allow the ability to find all spoofs known from any previous modeling.

At block 1402, generating of real pages (e.g., web pages written in HTML) is performed. Such real pages may be comprised of canonical DOM trees. The canonical DOM trees may further be stored in memory such as a hard disk.

At block 1404, loading of each page is performed by a browser, where an action sequence performed by the browser. The action sequence may be a canonical user action pumped by calling a routine, such as OnMouseMessage described above.

At block 1406, checking for spoofs is performed. The checking may done by intercepting the calls SetStatusText and FollowHyperlink described above.

At block 1408, block 1404 may be repeated for a next page.

Exemplary Computer Environment

Figure 15:
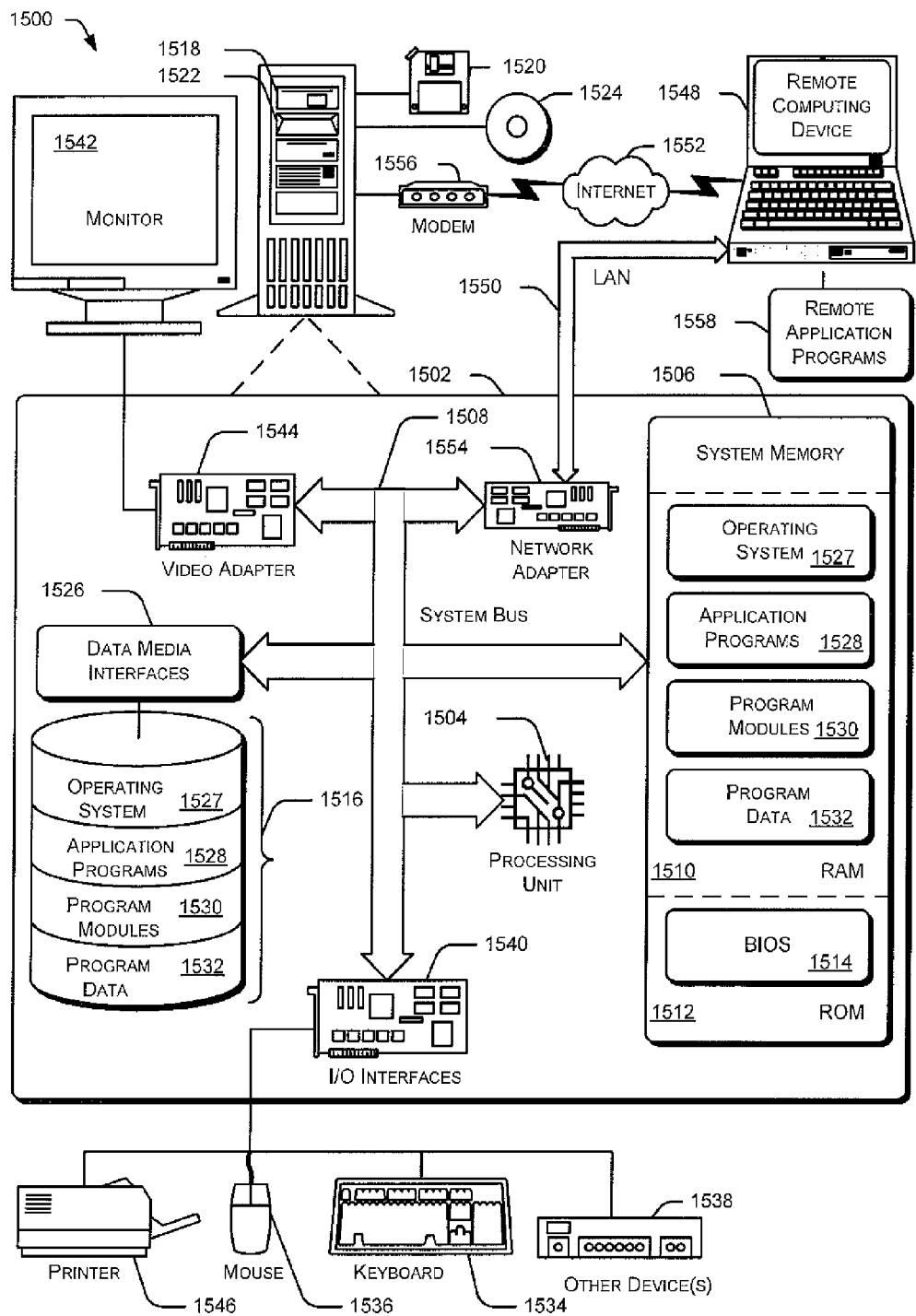
FIG. 15 is an illustration of a general computing environment for uncovering logic flaws in graphical user interface.

FIG. 15 illustrates an exemplary general computer environment, which can be used to implement the techniques described herein, and which may be representative, in whole or in part, of elements described herein. The computer environment 1500 is only one example of a computing environment and is not intended to suggest any limitation as to the scope of use or functionality of the computer and network architectures. Neither should the computer environment 1500 be interpreted as having any dependency or requirement relating to any one or combination of components illustrated in the example computer environment 1500.

Computer environment 1500 includes a general-purpose computing-based device in the form of a computer 1502. Computer 1502 can be, for example, a desktop computer, a handheld computer, a notebook or laptop computer, a server computer, a game console, and so on. The components of computer 1502 can include, but are not limited to, one or more processors or processing units 1504, a system memory 1506, and a system bus 1508 that couples various system components including the processor 1504 to the system memory 1506.

The system bus 1508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1502 typically includes a variety of computer readable media. Such media can be any available media that is accessible by computer 1502 and includes both volatile and non-volatile media, removable and non-removable media.

The system memory 1506 includes computer readable media in the form of volatile memory, such as random access memory (RAM) 1510, and/or non-volatile memory, such as read only memory (ROM) 1512. A basic input/output system (BIOS) 1514, containing the basic routines that help to transfer information between elements within computer 1502, such as during start-up, is stored in ROM 1512. RAM 1510 typically contains data and/or program modules that are immediately accessible to and/or presently operated on by the processing unit 1504.

Computer 1502 may also include other removable/non-removable, volatile/non-volatile computer storage media. By way of example, FIG. 15 illustrates a hard disk drive 1516 for reading from and writing to a non-removable, non-volatile magnetic media (not shown), a magnetic disk drive 1518 for reading from and writing to a removable, non-volatile magnetic disk 1520 (e.g., a "floppy disk"), and an optical disk drive 1522 for reading from and/or writing to a removable, non-volatile optical disk 1524 such as a CD-ROM, DVD-ROM, or other optical media. The hard disk drive 1516, magnetic disk drive 1518, and optical disk drive 1522 are each connected to the system bus 1508 by one or more data media interfaces 1526. Alternately, the hard disk drive 1516, magnetic disk drive 1518, and optical disk drive 1522 can be connected to the system bus 1508 by one or more interfaces (not shown).

The disk drives and their associated computer-readable media provide non-volatile storage of computer readable instructions, data structures, program modules, and other data for computer 1502. Although the example illustrates a hard disk 1516, a removable magnetic disk 1520, and a removable optical disk 1524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 1516, magnetic disk 1520, optical disk 1524, ROM 1512, and/or RAM 1510, including by way of example, an operating system 1527, one or more application programs 1528, other program modules 1530, and program data 1532. Each of such operating system 1527, one or more application programs 1528, other program modules 1530, and program data 1532 (or some combination thereof) may implement all or part of the resident components that support the distributed file system.

A user can enter commands and information into computer 1502 via input devices such as a keyboard 1534 and a pointing device 1536 (e.g., a "mouse"). Other input devices 1538 (not shown specifically) may include a microphone, joystick, game pad, satellite dish, serial port, scanner, and/or the like. These and other input devices are connected to the processing unit 1504 via input/output interfaces 1540 that are coupled to the system bus 1508, but may be connected by other interface and bus structures, such as a parallel port, game port, or a universal serial bus (USB).

A monitor 1542 or other type of display device can also be connected to the system bus 1508 via an interface, such as a video adapter 1544. In addition to the monitor 1542, other output peripheral devices can include components such as speakers (not shown) and a printer 1546 which can be connected to computer 1502 via the input/output interfaces 1540.

Computer 1502 can operate in a networked environment using logical connections to one or more remote computers, such as a remote computing-based device 1548. By way of example, the remote computing-based device 1548 can be a personal computer, portable computer, a server, a router, a network computer, a peer device or other common network node, and the like. The remote computing-based device 1548 is illustrated as a portable computer that can include many or all of the elements and features described herein relative to computer 1502.

Logical connections between computer 1502 and the remote computer 1548 are depicted as a local area network (LAN) 1550 and a general wide area network (WAN) 1552. Such networking environments are commonplace in offices, enterprise-wide computer networks, intranets, and the Internet.

When implemented in a LAN networking environment, the computer 1502 is connected to a local network 1550 via a network interface or adapter 1554. When implemented in a WAN networking environment, the computer 1502 typically includes a modem 1556 or other means for establishing communications over the wide network 1552. The modem 1556, which can be internal or external to computer 1502, can be connected to the system bus 1508 via the input/output interfaces 1540 or other appropriate mechanisms. It is to be appreciated that the illustrated network connections are exemplary and that other means of establishing communication link(s) between the computers 1502 and 1548 can be employed.

In a networked environment, such as that illustrated with computing environment 1500, program modules depicted relative to the computer 1502, or portions thereof, may be stored in a remote memory storage device. By way of example, remote application programs 1558 reside on a memory device of remote computer 1548. For purposes of illustration, application programs and other executable program components such as the operating system are illustrated herein as discrete blocks, although it is recognized that such programs and components reside at various times in different storage components of the computing-based device 1502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

The above-described methods and system describe simplified concepts of uncovering logic flaws in graphical user interface. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
A processor examining graphic user interface (GUI) logic;
identifying flaws in the logic that expose security damage;
mapping a visual invariant to a program invariant;
discovering inputs to the GUI logic that include a user action and an execution context to cause the program invariant to be violated; and
uncovering browser address bar spoofing by examining for logic correctness as to navigation functionality that includes loading a new page, travelling back in the history log, and opening a new window.

2. The method of claim 1, wherein the flaws include GUI design and implementation.

3. The method of claim 2, wherein spoofing scenarios as to an Internet browser are examined.

4. The method of claim 3 wherein the spoofing scenario includes a secure socket layer (SSL) certificate spoof.

5. The method of claim 3 wherein the spoofing scenario includes non-markup language navigation.

6. The method of claim 1, wherein the flaws are directed to non browser applications.

7. The method of claim 6, wherein the non browser applications include email clients, word processing utilities, and identity management systems.

8. The method of claim 1,
wherein browser status bar spoofing is uncovered by examining source code for logic correctness of mouse-handling functionality of markup language elements.

9. The method of claim 1,
wherein browser status bar spoofing is uncovered by examining execution context of a spoofing attack that includes an HTML page, and user action sequence that include multiple raw mouse messages.

10. The method of claim 1,
wherein browser address bar spoofing is uncovered by examining execution context of a spoofing attack that includes a set of Boolean flags that affect the execution of navigation functions.

11. A method comprising:
A processor examining graphic user interface (GUI) logic;
identifying flaws in the logic that expose security damage;
mapping a visual invariant to a program invariant;
discovering inputs to GUI logic that include user actions and an execution context to cause the program invariant to be violated, the discovering comprising document object trees, active scripts, and user actions that cause the visual invariant to be violated; and
constructing real visual spoofing attacks based on the inputs to GUI logic.

12. The method of claim 11, wherein browser status bar spoofing is uncovered by examining source code for logic correctness of mouse-handling functionality of markup language elements.

13. The method of claim 11, wherein browser status bar spoofing is uncovered by examining execution context of a spoofing attack that includes an HTML page, and user action sequence that include multiple raw mouse messages.

14. A method comprising:
A processor generating a webpage that includes a canonical document object model tree;
loading the webpage through a browser, wherein an action sequence performed by the browser is simulated, and states of the browser are tracked; and
checking for spoofs when the loading is performed by examining graphic user interface (GUI) logic and identifying flaws in the logic that expose security damage, the action sequence and the checking for spoofs implemented using binary instrumentation tools.

15. The method of claim 14, wherein the action sequence is pumped by repeatedly calling a routine.

16. The method of claim 14 further comprising repeating generating the webpage by generating another webpage.

* * * * *